(12) United States Patent
Min

(10) Patent No.: US 12,041,873 B2
(45) Date of Patent: Jul. 23, 2024

(54) FINGER-BAR-TYPE MOWER WITH CENTER DRIVE

(71) Applicant: Jae-sik Min, Chungcheongbuk-do (KR)

(72) Inventor: Jae-sik Min, Chungcheongbuk-do (KR)

(*) Notice: Subject to any disclaimer, the term of this patent is extended or adjusted under 35 U.S.C. 154(b) by 750 days.

(21) Appl. No.: 17/263,246

(22) PCT Filed: Jul. 25, 2019

(86) PCT No.: PCT/KR2019/009211
§ 371 (c)(1),
(2) Date: Jan. 26, 2021

(87) PCT Pub. No.: WO2020/022788
PCT Pub. Date: Jan. 30, 2020

(65) Prior Publication Data
US 2021/0161068 A1   Jun. 3, 2021

(30) Foreign Application Priority Data
Jul. 27, 2018   (KR) .................. 10-2018-0087604

(51) Int. Cl.
*A01D 34/135*     (2006.01)
*A01D 34/14*      (2006.01)
(Continued)

(52) U.S. Cl.
CPC ......... *A01D 34/135* (2013.01); *A01D 34/145* (2013.01); *A01D 34/283* (2013.01); *A01D 34/30* (2013.01); *A01D 69/06* (2013.01)

(58) Field of Classification Search
CPC .... A01D 34/145; A01D 34/135; A01D 34/30; A01D 69/06; A01D 34/28; A01D 34/283;
(Continued)

(56) References Cited

U.S. PATENT DOCUMENTS 190,025 A * 4/1877 Gilman .................. A01D 34/02
56/274
1,229,000 A * 6/1917 Welch .................... A01D 34/02
56/264
(Continued)

FOREIGN PATENT DOCUMENTS

JP          3217123 U      7/2018
KR   20-2000-0017090 U    9/2000
(Continued)

OTHER PUBLICATIONS

KR_100609464_B1_-_English_translation, Aug. 8, 2006.*
(Continued)

*Primary Examiner* — Thomas B Will
*Assistant Examiner* — Julia C Tran
(74) *Attorney, Agent, or Firm* — Finch & Maloney PLLC

(57) ABSTRACT

A finger-bar-type mower in which blades reciprocate left and right to mow grass. The mower includes: a connection gear which is power-connected to a driving means of the mower; a reduction gear connected to the connection gear; a shaft rotating according to rotation of the reduction gear; a bridge accommodating and supporting the connection gear and the reduction gear; a blade which is power-connected to the shaft and is reciprocated left and right according to rotation of the shaft, the blade including cutting edges; a guide part supporting the bridge and extending along the blade; and wheels respectively connected to both ends of the guide part. The shaft is disposed in center regions of the blade and the guide part.

4 Claims, 4 Drawing Sheets

(51) Int. Cl.
*A01D 34/28* (2006.01)
*A01D 34/30* (2006.01)
*A01D 69/06* (2006.01)

(58) Field of Classification Search
CPC ........ A01D 34/02; A01D 34/03; A01D 34/04; A01D 34/14; A01D 34/40
See application file for complete search history.

(56) References Cited

U.S. PATENT DOCUMENTS

| | | | | | |
|---|---|---|---|---|---|
| 1,779,723 | A | * | 10/1930 | Ashby | A01D 34/30 56/17.6 |
| 2,654,200 | A | * | 10/1953 | Bathurst | A01D 34/10 56/17.6 |
| 3,058,286 | A | * | 10/1962 | Miller | A01D 34/02 56/17.6 |
| 3,153,310 | A | * | 10/1964 | Allen | A01D 34/28 56/322 |
| 3,517,494 | A | * | 6/1970 | Beusink | A01D 34/404 56/293 |
| 3,973,378 | A | * | 8/1976 | Bartasevich | A01D 34/305 56/246 |
| 4,885,902 | A | * | 12/1989 | Schmidt | A01D 44/00 56/8 |
| 5,461,848 | A | * | 10/1995 | Anthony | A01D 34/08 56/320.1 |
| 6,314,707 | B1 | * | 11/2001 | Ryan | A01D 34/305 56/17.6 |
| 6,889,492 | B1 | * | 5/2005 | Polk | A01D 41/142 56/257 |
| 7,406,770 | B2 | * | 8/2008 | Mace | A01D 34/14 83/837 |
| 8,011,272 | B1 | * | 9/2011 | Bich | A01D 34/305 74/595 |
| 8,959,780 | B2 | * | 2/2015 | Masalin | A01G 3/053 30/223 |
| 10,537,069 | B2 | * | 1/2020 | Wykman | A01G 3/04 |
| 2014/0130472 | A1 | * | 5/2014 | Cook | A01D 34/30 56/16.4 R |
| 2014/0245713 | A1 | * | 9/2014 | Cook | A01D 34/30 56/290 |

FOREIGN PATENT DOCUMENTS

| | | |
|---|---|---|
| KR | 10-0609464 B1 | 8/2006 |
| KR | 10-0623191 B1 | 9/2006 |
| KR | 10-2010-0057542 A | 5/2010 |

OTHER PUBLICATIONS

KR_2010057542_A_I_-_English_Translation, May 31, 2010.*
International Search Report Corresponding to PCT/KR2019/009211 mailed Oct. 31, 2019.
Written Opinion Corresponding to PCT/KR2019/009211 mailed Oct. 31, 2019.

* cited by examiner

FINGER-BAR-TYPE MOWER WITH CENTER DRIVE

TECHNICAL FIELD

The present invention relates to a finger-bar-type mower in which blades reciprocate left and right to mow grass.

BACKGROUND ART

Mowers are largely classified into a type of mowing grass by means of high-speed rotation of blades, and a type of mowing grass with blades which are arranged in a long shape like scissors and are reciprocated left and right at a high speed. The latter is also called a finger bar type.

The type of using high-speed rotation of blades is good in terms of operation and accessibility, but may cause dangers due to scattering of work residues during work and may make operators tired and thus exposed to danger because operators themselves have to maintain the mower at a certain height from the ground.

Finger-bar-type mowers, which are technically originated from pruning machines, are relatively safe and have high performance in terms of quality and thus have been recently developed into a larger type configured to be attached to a tractor.

However, finger-bar-type mowers are mechanically limited because driving power is transmitted from one end side, and thus it is difficult to use finger-bar-type mowers together with small machines and implement portable finger-bar-type mowers.

DESCRIPTION OF EMBODIMENTS

Technical Problem

Therefore, the present invention is invented by considering the above-mentioned circumstances, and an objective of the present invention is to provide a finger-bar-type mower in which a driving shaft is disposed at the center of a blade and wheels are attached to both end sides such that the finger-bar-type mower can be easily operated by placing the finger-bar-type mower on the ground and moving the finger-bar-type mower along the ground.

Solution to Problem

For the above-described objective of the present invention, a finger-bar-type mower includes: a connection gear which is power-connected to a driving means of the finger-bar-type mower; a reduction gear which is connected to the connection gear; a shaft which is rotated according to rotation of the reduction gear; a bridge which accommodates and supports the connection gear and the reduction gear; a blade which is power-connected to the shaft and is reciprocated left and right according to rotation of the shaft, the blade including cutting edges; a guide part which supports the bridge and extends along the blade; and wheels which are respectively connected to both ends of the guide part, wherein the shaft is disposed in center regions of the blade and the guide part.

The guide part is connected to the wheels such that the guide part has an adjustable height from ground.

In addition, the blade includes an upper blade and a lower blade, and as the shaft is rotated, the cutting edges of the upper blade and the lower blade repeatedly approach each other and depart from each other.

In addition, the finger-bar-type mower further includes: a first part gear and a second part gear which are connected to the shaft and have teeth formed on only circumferential portions thereof; and a first return gear and a second return gear which each have a first tooth array and a second tooth array parallel to each other and which are capable of reciprocating left and right by engagement with the teeth of the first and second part gears, wherein the upper blade is connected to a lower portion of the first return gear, and the lower blade is connected to an upper portion of the second return gear, wherein the teeth of the first part gear are formed opposite to the teeth of the second part gear, and the upper blade and the lower blade may be moved in opposite directions.

In addition, finger-bar-type mower further includes: a gear case which is power-connected to the driving means and includes a connection shaft at a lower side thereof, the connection shaft being connected to the connection gear; and a roof housing which surrounds the gear case from an upper side, wherein the bridge is coupled to a center portion of the guide part, and the roof housing is fastened to the bridge.

Advantageous Effects of Disclosure

According to the present invention, it is possible to provide a finger-bar-type mower in which a driving shaft is disposed at the center of a blade and wheels are attached to both end sides such that the finger-bar-type mower can be easily operated by placing the finger-bar-type mower on the ground and moving the finger-bar-type mower along the ground.

Figure 1:
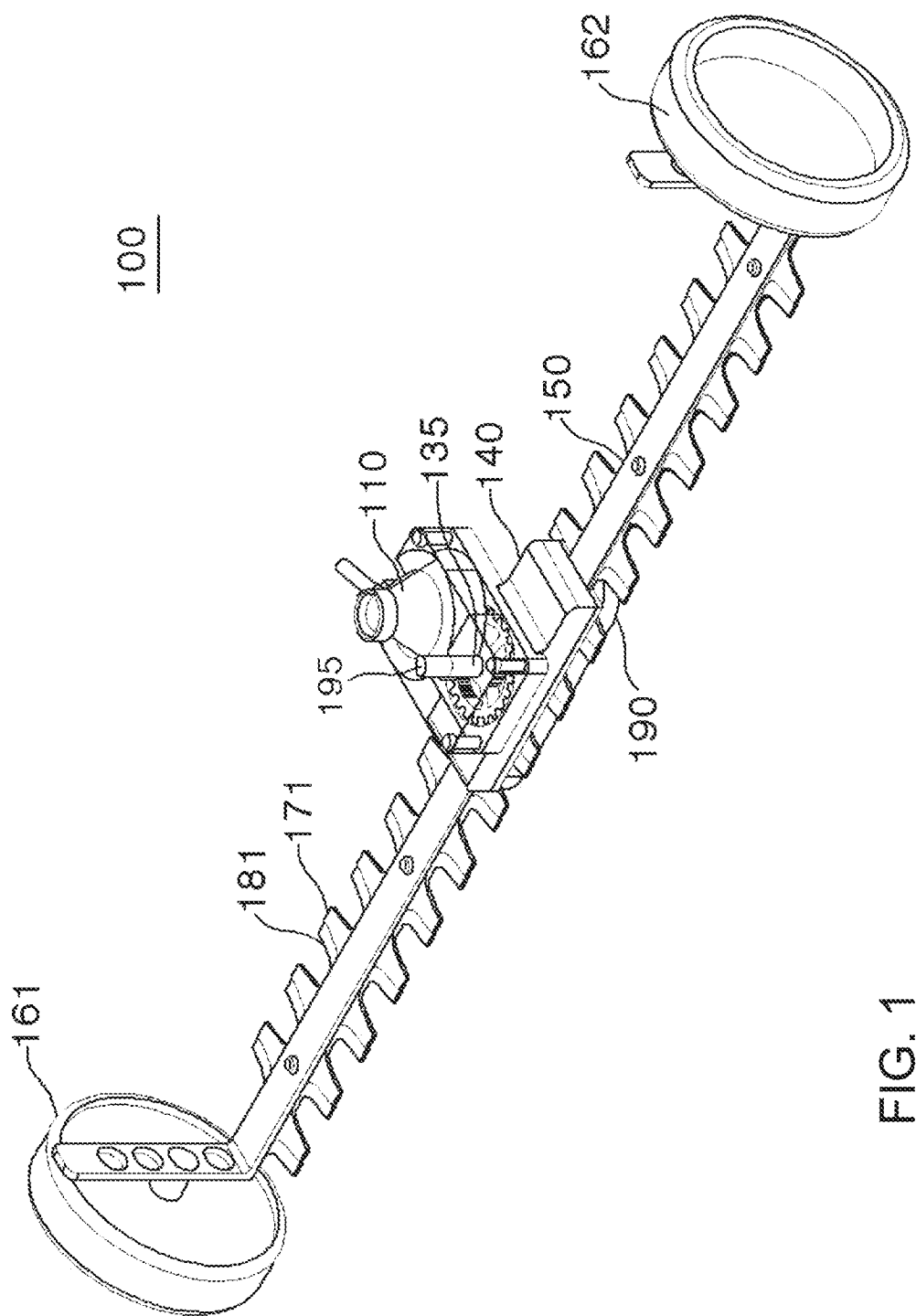
FIG. 1 is a view illustrating an assembled state of a mower according to an embodiment of the present invention.

| <Descriptions of reference numerals> | |
|---|---|
| 100: mower | 110: roof housing |
| 115: intermediate cover | 120: gear case |
| 121: connection shaft | 125: connection gear |
| 130: reduction gear | 135: shaft |
| 140: bridge | 150: guide part |
| 151: bent portion | 152: wheel-fixing hole |
| 153: through-hole | 161, 162: wheels |
| 171: upper blade | 172: first part gear |
| 175: first return gear | 181: lower blade |
| 182: second part gear | 185: second return gear |
| 190: lower cover | 195: external power transmission shaft |

MODE OF DISCLOSURE

Hereinafter, configurations and operations will be described in detail according to preferred embodiments of the present invention with reference to the accompanying drawings. When allocating reference numerals to elements in the drawings, like elements are denoted, if possible, with like reference numerals even though the elements are illustrated in different drawings.

Figure 2:
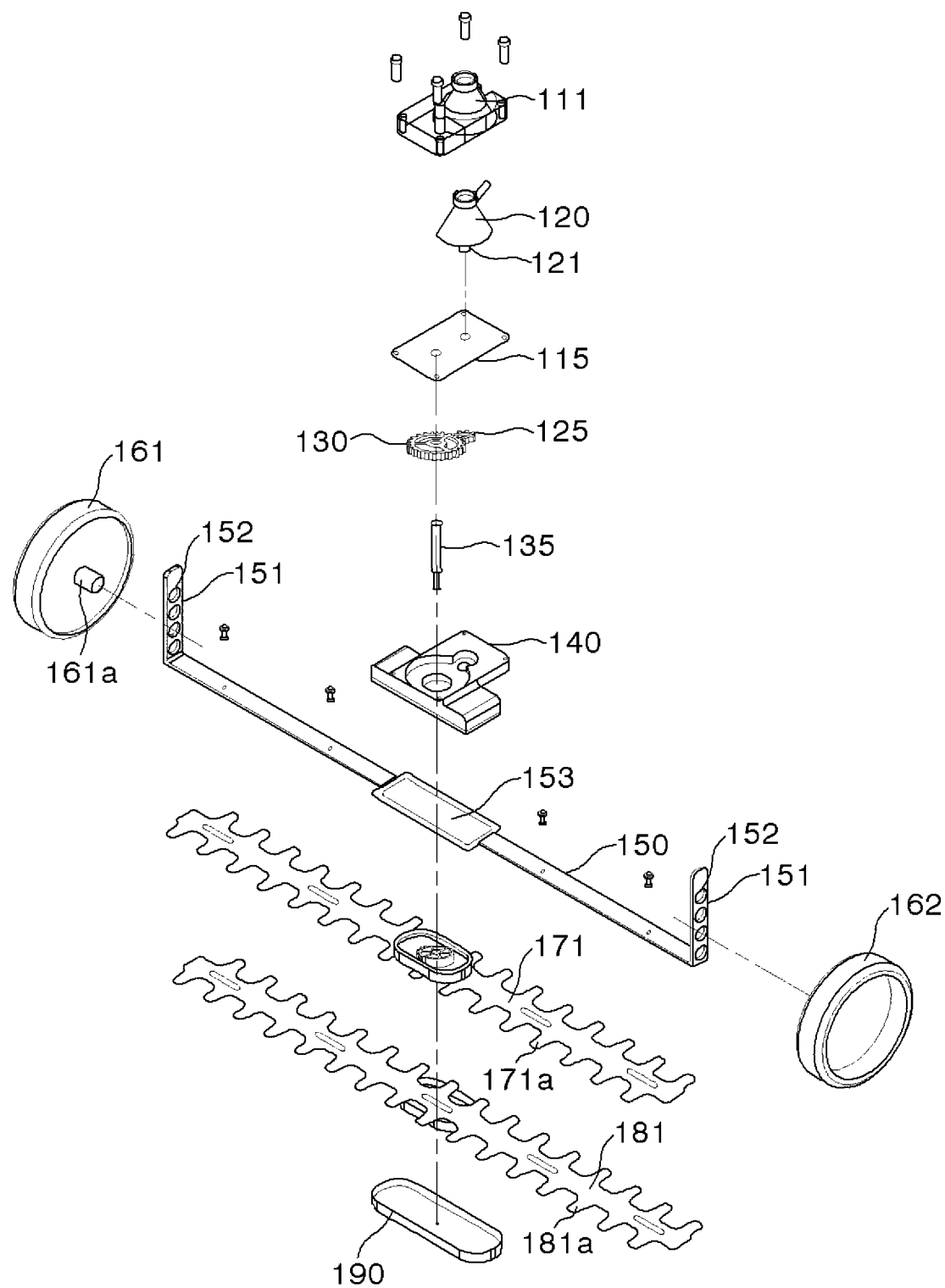
FIG. 2 is an exploded view illustrating a disassembled state of the mower shown in FIG. 1.
Figure 3:
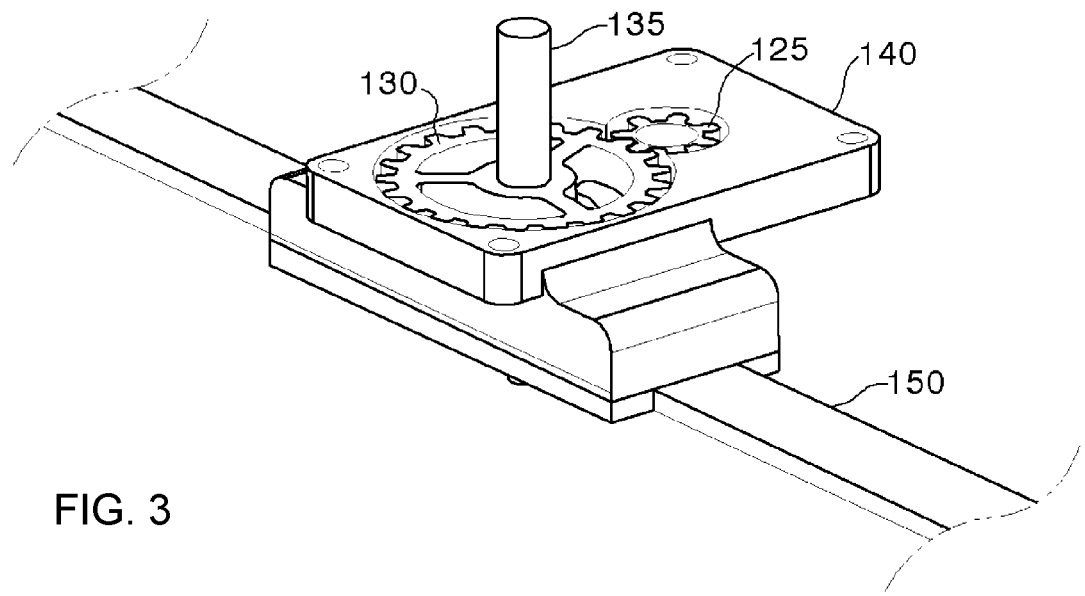
FIG. 3 is a view illustrating a state in which a connection gear and a reduction gear are accommodated in a bridge in the mower according to the present invention.
Figure 4:
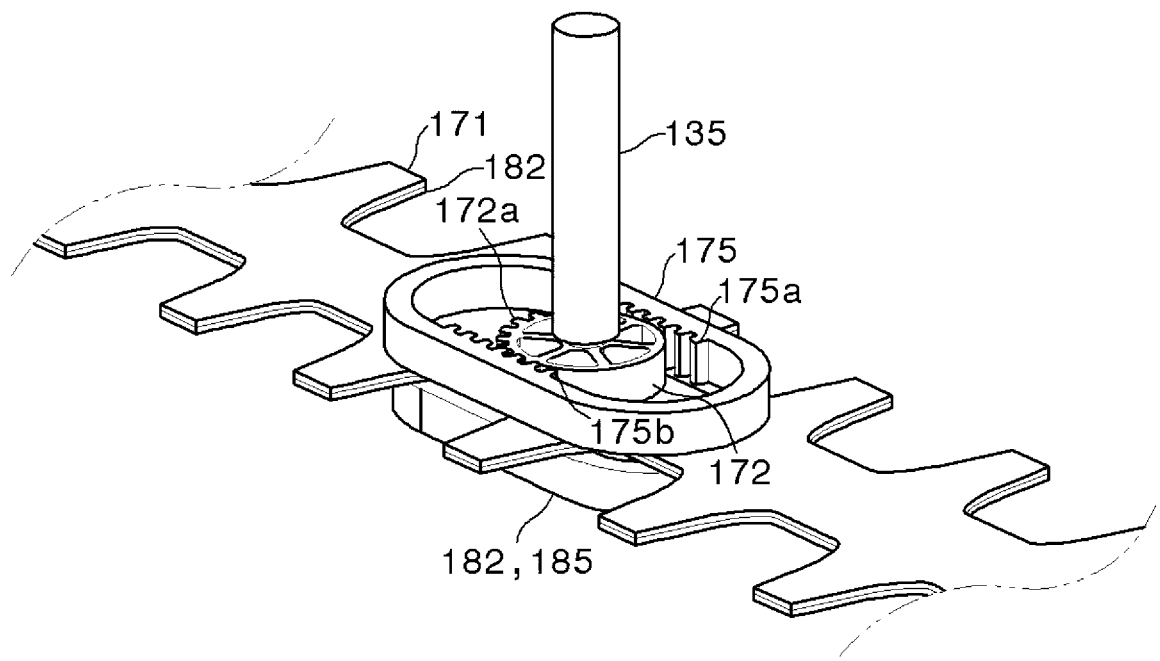
FIG. 4 is a perspective view illustrating a state in which a part gear and a return gear are coupled to a shaft in the mower according to the present invention.
Figure 5:
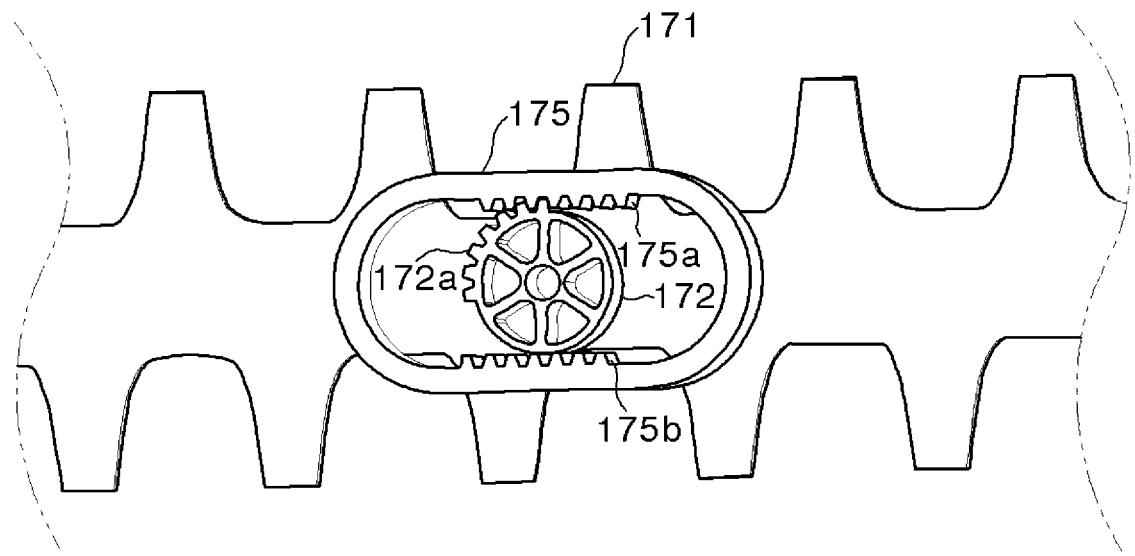
FIG. 5 is a plan view illustrating the part gear and the return gear of the mower according to the present invention.
Figure 6:
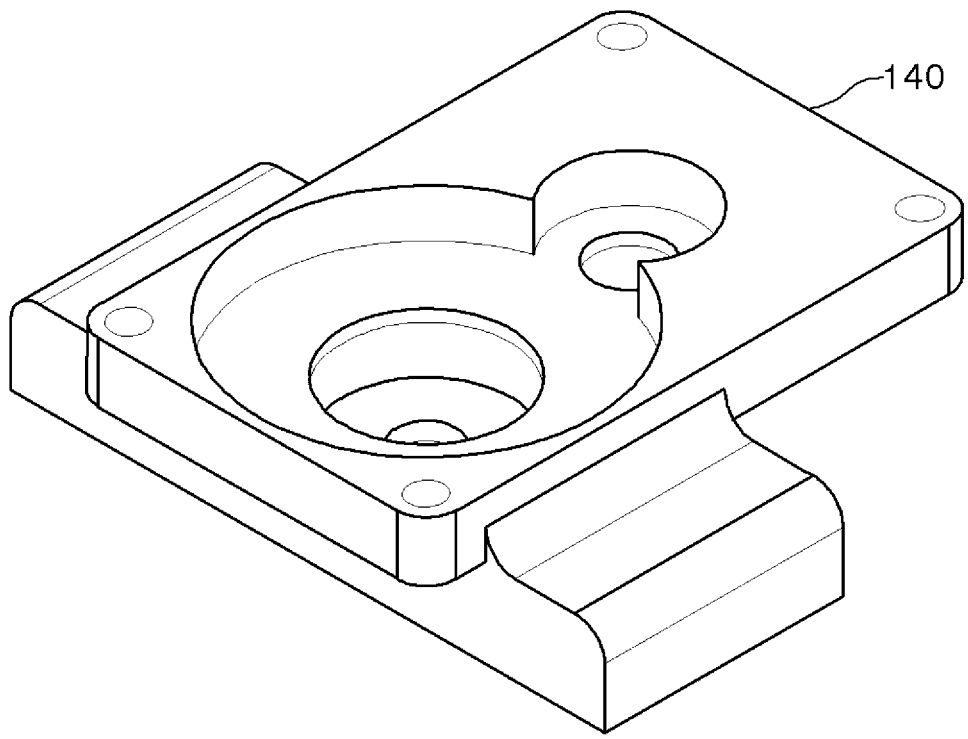
FIG. 6 is a view illustrating the bridge of the mower according to the present invention.

FIG. 1 is a view illustrating an assembled state of a mower according to an embodiment of the present invention. FIG. 2 is an exploded view illustrating a disassembled state of the mower shown in FIG. 1. FIG. 3 is a view illustrating a state in which a connection gear and a reduction gear are accommodated in a bridge in the mower according to the present invention. FIG. 4 is a perspective view illustrating a state in which a part gear and a return gear are coupled to a shaft in the mower according to the present invention. FIG. 5 is a plan view illustrating the part gear and the return gear of the mower according to the present invention. FIG. 6 is a view illustrating the bridge of the mower according to the present invention.

The present invention provides a finger-bar-type mower (hereinafter, referred to as a mower 100) in which a driving shaft is disposed in center regions of blades and wheels are attached to both end sides such that the mower 100 can be easily operated by placing the mower on the ground and moving the mower 100 along the ground.

The mower 100 includes a gear case 120, a connection gear 125, a reduction gear 130, a shaft 135, a bridge 140, a roof housing 110, a guide part 150, wheels 161 and 162, an upper blade 171, a lower blade 181, part gears 172 and 182, and return gears 175 and 185.

The gear case 120 is power-connected to a motor (driving means) provided in a main body (not shown) of the mower 100, and a connection shaft 121 is provided on a lower portion of the gear case 120 for being rotated according to the rotation of the motor.

The roof housing 110 surrounds the gear case 120 from an upper side to protect the gear case 120 and is fastened to the bridge 140 to accommodate components therein.

The connection gear 125 is a part that is power-connected to the driving means of the mower 100, and in an embodiment, the connection gear 125 may be power-connected to the connection shaft 121 of the gear case 120.

The reduction gear 130 is connected to the connection gear 125 to reduce the speed of rotation when power is transmitted from the motor.

The shaft 135 is rotated according to the rotation of the reduction gear 130 for transmitting the driving power of the motor to the upper blade 171 and the lower blade 181.

The bridge 140 accommodates and supports the connection gear 125 and the reduction gear 130 in a recess formed therein.

Blades include the upper blade 171 and the lower blade 181 and are power-connected to the shaft 135 for being reciprocated left and right according to the rotation of the shaft 135. The upper blade 171 and the lower blade 181 are provided with cutting edges 171a and 181a for cutting grass.

The guide part 150 supports the bridge 140 and extends along the blades 171 and 181. A through-hole 153 through which the shaft 135 may pass is formed in a center region of the guide part 150. The shaft 135 is disposed at center regions of the blades 171 and 181 and the guide part 150 and transmits power from the motor to the blades 171 and 181.

The wheels 161 and 162 are connected to both ends of the guide part 150, respectively. The guide part 150 is connected to the wheels 161 and 162 in such a manner that the height of the guide part 150 can be adjusted with respect to the ground. For example, bent portions 151 are formed on end portions of the guide part 150, and a plurality of wheel-fixing holes 152 are formed in the bent portions 151 at intervals in the longitudinal direction of the bent portions 151. Wheel axles 161a of the wheels 161 and 162 may be inserted into wheel-fixing holes 152 for being fastened to the guide part 150.

The height of the guide part 150 may be varied with respect to the ground by separating the wheel axles 161a from the wheel-fixing holes 152 and fastening the wheel axles 161a to other wheel-fixing holes 152 having a different height.

The bridge 140 is coupled, by welding or the like, to the center region of the guide part 150 in which the through-hole 153 is located.

The roof housing 110 is fastened to the bridge 140 by fastening members 111. In a space formed by the roof housing 110 and the bridge 140, the gear case 120, the connection gear 125, and the reduction gear 130 are accommodated and fixed. An intermediate cover 115 may be positioned above the connection gear 125 and the reduction gear 130 and may be fastened together with the roof housing 110 and the bridge 140. The intermediate cover 115 supports upper portions of the connection gear 125 and the reduction gear 130.

Referring to FIGS. 4 and 5, the shaft 135 is rotatably accommodated in the roof housing 110 and the bridge 140, and a portion of the shaft 35 extends downward and is coupled to the part gears 172 and 182 for transmitting power.

The part gears 172 and 182 are power-connected to the shaft 135, and teeth 172a may be formed on only a circumferential portion of the part gears 172 and 182. For example, the teeth 172a may be formed within a range of about 90° along the circumference of the part gear 172. The part gears 172 and 182 include a first part gear 172 for driving the upper blade 171, and a second part gear 182 for driving the lower blade 181.

The return gears 175 and 185 may include a first tooth array 175a and a second tooth array 175b that are parallel to each other while extending in a transverse direction, and the return gears 175 and 185 may be reciprocated left and right as being connected to the teeth 172a of the part gear 172. The return gears 175 and 185 include a first return gear 175 and a second return gear 185.

The upper blade 171 is connected to a lower portion of the first return gear 175 by a coupling means such as a key, and the lower blade 181 is connected to an upper portion of the second return gear 185. A lower cover 190 accommodates and supports the second part gear 182 and the second return gear 185 from a lower side.

In the drawings, although the second part gear 182 and the second return gear 185 which are located under the lower blade 181 are not clearly shown, the second part gear 182 and the second return gear 185 have the same structures as the first part gear 172 and the first return gear 175. However, the position of teeth of the second part gear 182 is opposite the position of the teeth 172a of the first part gear 172 such that the lower blade 181 and the upper blade 171 may reciprocate in opposite directions.

When the shaft 135 is rotated, the first part gear 172 and the second part gear 182 are rotated. Then, the teeth 172a are engaged with the first tooth array 175a of the first return gear 175, thereby moving the first return gear 175 to the right. When the first return gear 175 is moved to the right, the upper blade 171 connected to the first return gear 175 is also moved to the right.

Next, as the first part gear 172 is further rotated, the teeth 172a are engaged with the second tooth array 175b of the first return gear 175, thereby moving the first return gear 175 to the left and the upper blade 171 connected to the first return gear 175 to the left as well.

The teeth of the second part gear 182 are formed opposite to the teeth 172a of the first part gear 172 such that when the first return gear 175 is moved to the right, the second return gear 185 is moved to the left, and when the first return gear 175 is moved to the left, the second return gear 185 is moved to the right. The lower blade 181 connected to the second return gear 185 is moved together with the second return gear 185.

Therefore, when the shaft 135 is rotated, the cutting edges of the upper blade 171 and the lower blade 181 repeatedly approach each other and depart from each other, thereby mowing grass by shear force.

In addition, an external power transmission shaft 195 may be power-connected to the shaft 135 and may extend outward from the roof housing 110. The external power transmission shaft 195 extending outward from the roof housing 110 may be used later to provide driving power to a self-propelled wheel or a grass collector.

As described above, the two blades 171 and 181, which are in close contact with each other, repeat a high-speed reciprocating motion as the part gears 172 and 182 attached to the shaft 135 interact with the return gears 175 and 185. Therefore, an operator may mow grass by pulling and pushing the mower 100 on the ground using the wheels 161 and 162 without the burden of a weight.

In addition, since the shaft 135 is located in the center regions of the blades 171 and 181 of the mower 100 of the present invention, an operator may, if necessary, increase or decrease the width of the blades 171 and 181 to the left or right without the burden of a weight.

It is apparent to those of ordinary skill in the art that the present invention is not limited to the above-described embodiment embodiments, and various modifications or changes may be made therein without departing from the technical scope of the present invention.

The invention claimed is:

1. A finger-bar-type mower comprising:
   a connection gear which is power-connected to a driving means of the finger-bar-type mower;
   a reduction gear which is connected to the connection gear;
   a shaft which is rotated according to rotation of the reduction gear;
   a bridge which accommodates and supports the connection gear and the reduction gear;
   a blade which is power-connected to the shaft and is reciprocated left and right according to rotation of the shaft, the blade comprising cutting edges at front and rear;
   a guide part which supports the bridge and extends along the blade; and
   wheels which are respectively connected to both ends of the guide part, wherein the shaft is disposed in center regions of the blade and the guide part,
   a through-hole through which the shaft passes is formed in a center region of the guide part,
   the bridge is coupled to the center region of the guide part in which the through-hole is located,
   the blade is coupled to the guide part and supported by the guide part,
   the blade comprises an upper blade and a lower blade, and as the shaft is rotated, the cutting edges of the upper blade and the lower blade repeatedly approach each other and depart from each other,
   the cutting edges protrude forward and backward of the guide part, and grass is cut by moving the wheels forward or backward using the cutting edges,
   the bridge is located above the guide part and the blade is located below the guide part.

2. The finger-bar-type mower of claim 1, wherein the guide part is connected to the wheels such that the guide part has an adjustable height from ground.

3. The finger-bar-type mower of claim 1, further comprising:
   a first part gear and a second part gear which are connected to the shaft and have teeth formed on only circumferential portions thereof; and
   a first return gear and a second return gear which each have a first tooth array and a second tooth array parallel to each other and which are capable of reciprocating left and right by engagement with the teeth of the first and second part gears,
   wherein the upper blade is connected to a lower portion of the first return gear, and
   the lower blade is connected to an upper portion of the second return gear.

4. The finger-bar-type mower of claim 1, further comprising:
   a gear case which is power-connected to the driving means and comprises a connection shaft at a lower side thereof, the connection shaft being connected to the connection gear; and
   a roof housing which surrounds the gear case from an upper side,
   wherein the bridge is coupled to a center portion of the guide part, and
   the roof housing is fastened to the bridge.

* * * * *